United States Patent [19]
Toyoda et al.

[11] 4,441,464
[45] Apr. 10, 1984

[54] INTAKE SYSTEM OF A MULTI-CYLINDER INTERNAL COMBUSTION ENGINE

[75] Inventors: Shuhei Toyoda; Toshio Tanahashi, both of Toyota, Japan

[73] Assignee: Toyota Jidosha Kogyo Kabushiki Kaisha, Toyota, Japan

[21] Appl. No.: 300,049

[22] Filed: Sep. 8, 1981

Related U.S. Application Data

[63] Continuation of Ser. No. 35,390, May 2, 1979, abandoned.

[30] Foreign Application Priority Data

Aug. 10, 1978 [JP] Japan ................................. 53-97607

[51] Int. Cl.³ ............................................. F02B 31/00
[52] U.S. Cl. ................................. 123/52 MB; 123/308
[58] Field of Search ............ 123/52 R, 52 M, 52 MB, 123/492, 306, 308, 432

[56] References Cited

U.S. PATENT DOCUMENTS

| | | | |
|---|---|---|---|
| 1,307,896 | 6/1919 | Colardeau | 123/52 MB |
| 2,028,585 | 1/1936 | Blake et al. | 123/52 M |
| 3,713,630 | 1/1973 | Laprade et al. | 123/442 |

FOREIGN PATENT DOCUMENTS

| | | | |
|---|---|---|---|
| 2249733 | 4/1974 | Fed. Rep. of Germany | 123/52 MB |
| 1153559 | 5/1969 | United Kingdom | 123/52 M |
| 1195060 | 6/1970 | United Kingdom | 123/52 MB |

*Primary Examiner*—Craig R. Feinberg
*Attorney, Agent, or Firm*—Kenyon & Kenyon

[57] ABSTRACT

A multi-cylinder engine comprising a carburetor housing forming therein at least two branch mixture passages. Each of the branch mixture passage is connected to a respective intake port. A throttle valve of the carburetor is provided for each cylinder. Each of the throttle valves is arranged in the respective branch mixture passage. A common connecting passage and branch connecting passages which are connected to the common connecting passage are provided. Each of the branch connecting passages opens into the respective intake port located downstream of the corresponding throttle valve. Another common connecting passage is provided. The branch mixture passages located upstream of the throttle valves are interconnected to each other via the other common connecting passage.

11 Claims, 7 Drawing Figures

INTAKE SYSTEM OF A MULTI-CYLINDER INTERNAL COMBUSTION ENGINE

This is a continuation of application Ser. No. 35,390 filed May 2, 1979, now abandoned.

DESCRIPTION OF THE INVENTION

The present invention relates to an intake system of a multi-cylinder internal combustion engine.

Particularly in a gasoline engine, in order to obtain a high output power of the engine by increasing the volumetric efficiency when the engine is operating at a high speed under a heavy load, the intake ports are shaped to have as small a flow resistance as possible. If the intake ports have such a shape, the strong turbulence spontaneously created in the combustion chamber of the engine when the engine is operating at a high speed under a heavy load causes the burning velocity to be sufficiently increased. However, when the same engine is operating at a low speed, a satisfactory strong turbulence is not created in the combustion chamber, and a sufficient increase in the burning velocity is not obtained.

One way of creating a strong turbulence in the combustion chamber when an engine is operating at a low speed is to force a swirl motion to be created in the combustion chamber by using a helically-shaped intake port or a shroud valve. However, such ports and valves increase the flow resistance to which the mixture fed into the cylinder is subjected, which reduces the volumetric efficiency the engine is operating at a high speed under a heavy load. In addition, an engine has been proposed that is capable of creating a strong turbulence in the combustion chamber by incorporating an intake passage that comprises a main part having a relatively large cross-section, and an auxiliary part having a relatively small cross-section and opening into the intake port. In such an engine, the mixture is fed into the combustion chamber from the auxiliary intake passage via the intake port when the engine is operating under a light load, thereby causing a turbulence to be produced in the combustion chamber by the mixture spouted from the auxiliary intake passage at a high speed. On the other hand, when the engine is operating under a heavy load, the mixture is fed into the combustion chamber via the main intake passage. In such an engine, it is possible to produce a strong turbulence in the combustion chamber when an engine is operating at a low speed under a light load, while ensuring a high volumetric efficiency when the engine is operating at a high speed under a heavy load. However, the engine just described has drawbacks in that the construction of a mixture passage switching mechanism for switching the mixture passage from the main intake passage to the auxiliary intake passage is complicated; in addition, it is impossible to produce a strong turbulence in the combustion chamber when the engine is operating at a low speed under a heavy load.

An object of the present invention is to provide an intake system of an internal combustion engine, which has a simple construction and which is capable of creating a strong turbulence in the combustion chamber independently of the engine speed when the engine is operating under a light load while ensuring a high volumetric efficiency when the engine is operating at a high speed under a heavy load.

According to the present invention, there is provided a multi-cylinder internal combustion engine having a plurality of cylinders, each having a combustion chamber and an intake valve which has a valve head the engine has at least one intake passage common to at least two cylinders and a collecting portion having an inlet and at least two branch intake passages branched off from the collecting portion. Each of the branch intake passages is connected to the respective combustion chamber via the corresponding intake valve. Fuel supply means are arranged in the inlet of the collecting portion. There are also a common connecting passage and at least two branch connecting passages, each connected to the common connecting passage and having an opening into the respective branch intake passage. Valve means are arranged in the branch intake passages at a position upstream of the openings of the branch connecting passages and are opened in accordance with an increase in the level of the load of said engine, and; a second connecting passage is provided having at least two ports, each being connected to the intake passage located between the valve means and the fuel supply means.

The present invention may be more fully understood from the description of preferred embodiments of the invention set forth below, together with the accompanying drawings.

DESCRIPTION OF PREFERRED EMBODIMENTS

Figure 1:
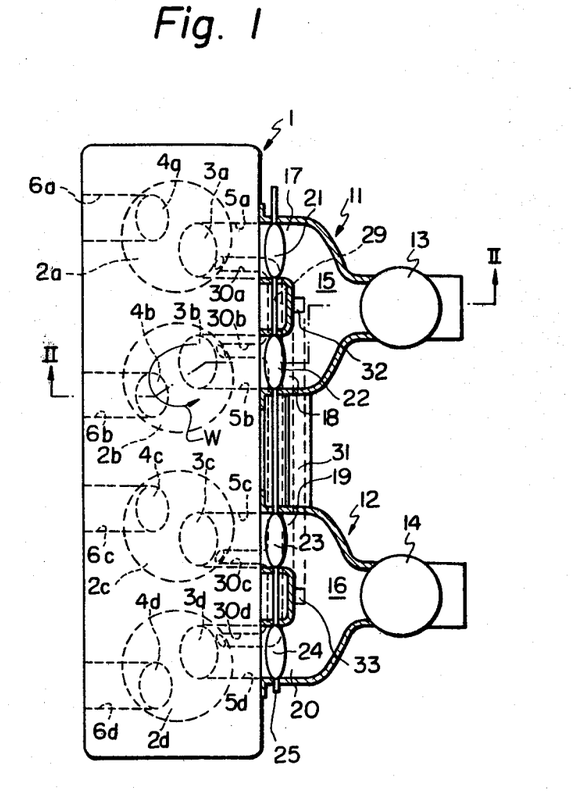
FIG. 1 is a plan view, partly in cross-section, of an embodiment of an engine according to the present invention.
Figure 2:
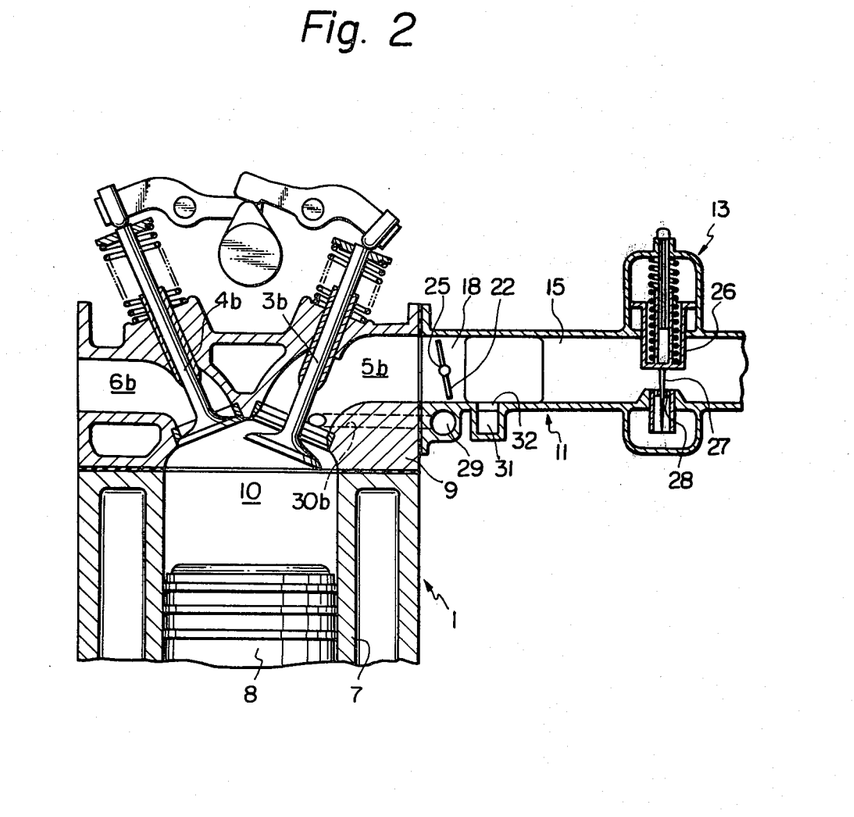
FIG. 2 is a cross-sectional side view taken along the line II—II in FIG. 1.

FIG. 1 shows an engine body 1 in which reference numerals 2a, 2b, 2c, 2d designate No. 1 cylinder, No. 2 cylinder, No. 3 cylinder and No. 4 cylinder, respectively. These cylinders have intake ports 3a–3d; exhaust valves 4a–4d; intake ports 5a–5d; and exhaust ports 6a–6d. Referring to FIG. 2, there is shown a cylinder block 7, a piston 8, which is reciprocally movable in the cylinder block 7, a cylinder head 9 fixed onto the cylinder block 7, and a combustion chamber 10 A spark plug (not shown) is arranged in the combustion chamber 10.

FIGS. 1 and 2 also show a pair of carburetor housings 11, 12 mounted on the engine body 1, and variable venturi type carburetor bodies 13, 14 arranged in the carburetor housings 11, 12, respectively. Two mixture passages 15, 16 formed in the carburetor housings 11, 12 are divided into two pairs of branch mixture passages 17, 18, 19, 20, and each of the branch mixture passages 17, 18, 19, 20 is respectively connected to one of the intake ports 5a, 5b, 5c, 5d. Throttle valves 21, 22, 23, 24 of the carburetor bodies 13, 14 are arranged in the corresponding branch mixture passages 17, 18, 19, 20 and attached to a common valve shaft 25, in this embodiment. However, instead of being attached to the common valve shaft 25, the throttle valves 21, 22, 23, 24 may be interconnected to each other by means of a link mechanism (not shown) so that the opening operation of all the throttle valves 21, 22, 23, 24 is controlled at the same time. As is illustrated in FIG. 2, the carburetor body 13 comprises a movable suction piston 26, a movable needle 27 and a metering jet 28. As is well known to those skilled in the art, the suction piston 26 moves up and down so that the vacuum produced in the mixture passage 15 located between the suction piston 26 and the throttle valve 22 is maintained at a constant level.

A common connecting channel 29 extending in the longitudinal direction of the engine body 1 and having a cross-sectional area which is smaller than that of the branch mixture passages 17, 18, 19, 20 is arranged beneath the throttle valves 21, 22, 23, 24. In addition, four channel branches 30a, 30b, 30c, 30d which are in communication with the common connecting channel 29 and which have a cross-sectional area smaller than that of the branch mixture passages 17, 18, 19, 20 are formed in the cylinder head 9, and the channel branches 30a, 30b, 30c, 30d open into the intake ports 5a, 5b, 5c, 5d at a position near the rear faces of the valve heads of the corresponding intake valves 3a, 3b, 3c, 3d, respectively. The openings of the channel branches 30a, 30b, 30c, 30d are directed to valve gaps formed between the corresponding intake valves 3a, 3b, 3c, 3d and their valve seats when the intake valves 3a, 3b, 3c, 3d are opened, respectively. In addition, as is illustrated in FIGS. 1 and 2, a connecting conduit 31 is arranged adjacent to the common connecting channel 29. The connecting conduit 31 is connected to the mixture passage 15 via an opening 32, on one hand and to the mixture passage 16 via an opening 33, on the other hand. Consequently, the mixture passages 15 and 16 are interconnected to each other via the connecting conduit 31 having a cross-sectional area which is smaller than that of the branch mixture passages 17, 18, 19, 20.

Figure 7:
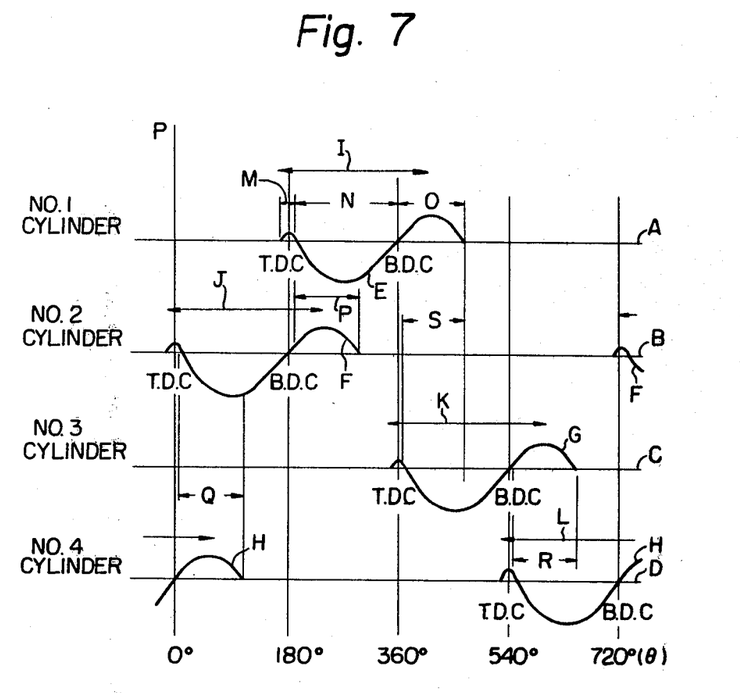
FIG. 7 is a graph showing changes in pressure in the intake port located at a position near the rear face of the valve head of the intake valve.

FIG. 7 illustrates changes in pressure in the intake ports 5a, 5b, 5c, and 5d. In FIG. 7, the abscissa θ indicates a crank angle, and the ordinate P indicates pressure in the intake port in the vicinity of the rear face of the valve head of the intake valve (hereinafter referred to as an intake port pressure). In addition, each of the reference lines A, B, C, D indicates the atmospheric pressure. Furthermore, in FIG. 7, the curved lines E, F, G and H indicate changes in pressure in ports 5a, 5b, 5c and 5d, respectively, and the arrows I, J, K and L indicate the opening duration of the intake valves 3a, 3b, 3c, and 3d, respectively. Referring to the change in pressure in the No. 1 cylinder shown in FIG. 7, the intake port has a positive pressure over the range M of the crank angle immediately after the intake valve is opened, and then a vacuum is produced over the range N of the crank angle in which the piston moves downwards. After this, the intake port pressure again becomes positive over the range O of the crank angle after the piston begins to move upwards. The change in the intake port pressure in the remaining cylinders is the same as that in the intake port pressure in the No. 1 cylinder. Consequently, referring to the range P of the crank angle of the No. 1 cylinder and No. 2 cylinder shown in FIG. 7, it will be understood that a vacuum is produced in the intake port of the No. 1 cylinder, and that, at this time, the intake port pressure of the No. 2 cylinder is positive. In addition, from FIG. 7 it will be understood that, referring to the range Q of the crank angle of the No. 2 cylinder and No. 4 cylinder, a vacuum is produced in the intake port of the No. 2 cylinder and, at this time, the intake port pressure of the No. 4 cylinder is positive. Referring to the range R of the crank angle of the No. 3 cylinder and the No. 4 cylinder, a vacuum is produced in the intake port of the No. 4 cylinder and, at this time, the intake port pressure of the No. 3 cylinder is positive. Similarly referring to the range S of the crank angle of the No. 1 cylinder and the No. 3 cylinder, a vacuum is produced in the intake port of the No. 3 cylinder and, at this time, the intake port pressure of the No. 1 cylinder is positive. Consequently, referring to the No. 1 cylinder and the No. 2 cylinder shown in FIG. 7, it will be understood that, in the first half of the intake stroke of the No. 1 cylinder, the mixture in the intake port 5b of the No. 2 cylinder is fed into the intake port 5a of the No. 1 cylinder via the channel branch 30b, the common connecting channel 29 and the channel branch 30a due to the pressure difference between the vacuum in the intake port 5a and the positive pressure in the intake port 5b. In the same manner as described above, when the No. 2 cylinder is in the intake stroke, the mixture in the intake port 5d of the No. 4 cylinder is fed into the intake port 5b of the No. 2 cylinder via the channel branch 30d, the common connecting channel 29 and the channel branch 30b; when the No. 4 cylinder is in the intake stroke, the mixture in the intake port 5c of the No. 3 cylinder is fed into the intake port 5d of the No. 4 cylinder via the channel branch 30c, the common connecting channel 29 and the channel branch 30d; and when the No. 3 cylinder is in the intake stroke, the mixture in the intake port 5a of the No. 1 cylinder is fed into the intake port 5a of the No. 3 cylinder via the channel branch 30a, the common connecting channel 29 and the channel branch 30c. As mentioned above, due to the pressure difference between the intake port pressures in the intake ports 5a, 5b, 5c, 5d, the mixture is spouted from the channel branches 30a, 30b, 30c, 30d of the cylinder which is in the intake stroke into the corresponding intake ports 5a, 5b, 5c, 5d at a high speed.

In operation, the mixtures formed in the carburetor bodies 13, 14 are fed into the intake ports 5a, 5b, 5c, 5d via the corresponding mixture passages 15, 16. Assuming that the No. 2 cylinder 2b is now in the intake stroke, the mixture is spouted from the channel branch 30b into the intake port 5b at a high speed as mentioned above. At this time, since the opening of the channel branch 30b is directed to the valve gap formed between the intake valve 3b and its valve seat when the intake valve 3b is opened, the mixture spouted from the channel branch 30b passes through the above-mentioned valve gap and then flows into the combustion chamber 10 at a high speed. As a result, the mixture flowing into the combustion chamber 10 causes a swirl motion shown by the arrow W in FIG. 1 in the combustion chamber 10. Due to this swirl motion, the burning velocity is considerably increased and a stable combustion can thus be obtained.

In the case wherein the mixture is fed from the separate carburetor bodies 13, 14 as illustrated in FIG. 1, if there were no passage interconnecting the passages 15 and 16, the air-fuel ratio of the mixture formed in the mixture passage 15 would not be equal to the air-fuel ratio of the mixture formed in the mixture passage 16, even if the fuel feed control mechanisms of the carburetor body 13, 14 were precisely adjusted so as to form the mixtures of the same air-fuel ratio in the mixture passages 15 and 16. This would cause the air-fuel ratio of the mixture fed into the No. 1 cylinder and the No. 2 cylinder to be different from that of the mixture fed into the No. 3 cylinder and the No. 4 cylinder. However, by interconnecting the mixture passages 15, 16 to each other via the connecting conduit 31, as illustrated in FIG. 1, the mixtures in the mixture passages 15, 16 are mixed with each other. As a result, the air-fuel ratios of the mixtures fed into the cylinders become uniform and, thus, the distribution of fuel to each cylinder becomes uniform.

Figure 3:
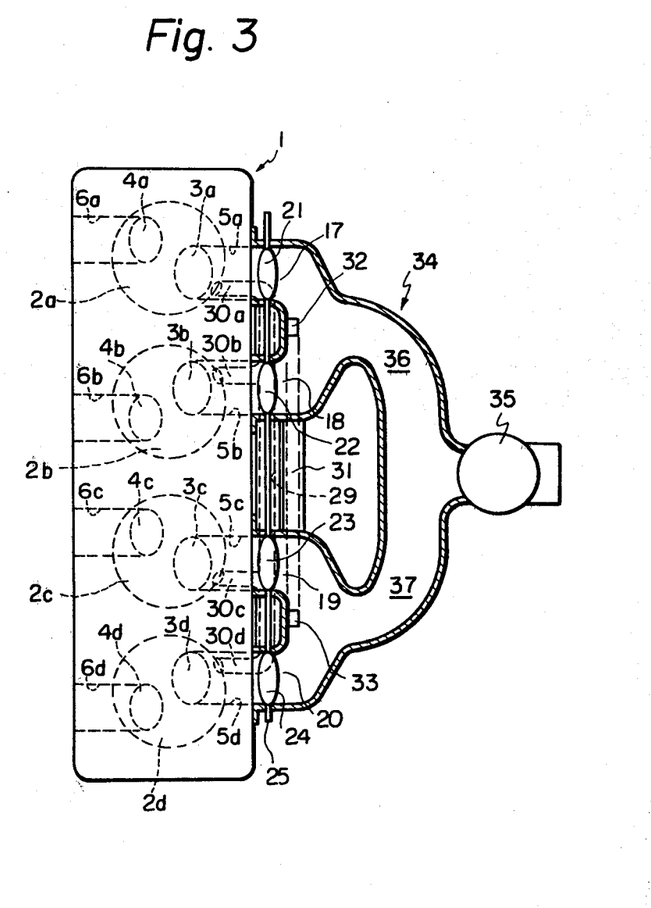
FIG. 3 is a plan view, partly in cross-section, of another embodiment according to the present invention.

FIG. 3 illustrates another embodiment according to the present invention. In this embodiment, a single variable venturi type carburetor body 35 having a construction which is the same as that of the carburetor body 13 illustrated in FIG. 2 is arranged in a carburetor housing 34. The outlet passage of the carburetor body 35 is divided into two mixture passages 36, 37, and each of the mixture passages 36, 37 is divided into four respective branch mixture passages 17, 18, 19, 20. Each of the throttle valves 21, 22, 23, 24 is arranged in the respective branch mixture passages 17, 18, 19, 20. In this embodiment, there is an advantage in that the number of the carburetor bodies can be reduced as compared with the case illustrated in FIG. 1.

As is illustrated in FIG. 3, even if the engine is provided with only the single carburetor body 35, the air-fuel ratios of the mixtures in the mixture passages 36, 37 do not become equal to each other. However, by interconnecting the mixture passages 36, 37 to each other via the connecting conduit 31, the distribution of fuel to each cylinder becomes uniform.

Figure 4:
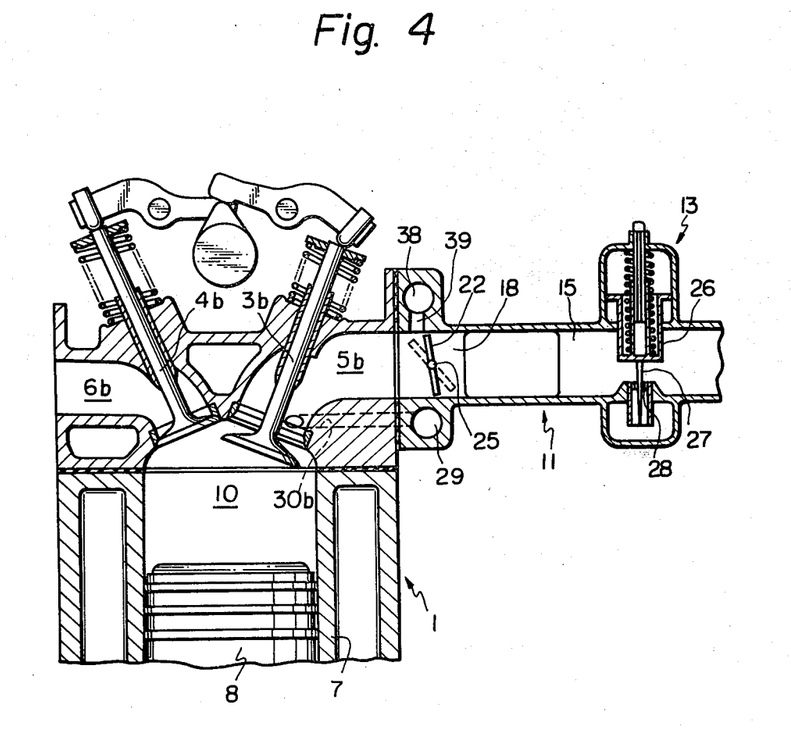
FIG. 4 is a cross-sectional side view of a further embodiment according to the present invention.

FIG. 4 illustrates a further embodiment according to the present invention. Referring to FIG. 4, another common connecting conduit 38 is arranged above the throttle valve 22 and connected to the mixture passage 18 via an opening 39 which is formed on the upper wall of the mixture passage 18. The opening 39 is so arranged that it opens into the mixture passage 18 located downstream of the throttle valve 22, when the throttle valve 22 is positioned at its idling position, as illustrated by the solid line in FIG. 4, and into the mixture passage 18 located upstream of the throttle valve 22, when the throttle valve 22 is opened, as illustrated by the broken line in FIG. 4. Consequently, when the engine in this embodiment is idling, the common connecting conduit 38 has a function which is the same as that of the common connecting passage 29 and, thus, at the time of the intake stroke, the mixture is spouted from the opening 39 into the mixture passage 18. As a result, at the time of idling, a strong turbulence of the mixture flowing into the intake port 5b is created by the mixture spouted from the common connecting conduit 38. On the other hand, when the throttle valve 22 is opened, the common connecting conduit 38 has a function which is the same as that of the connecting conduit 31 illustrated in FIG. 1.

Figure 5:
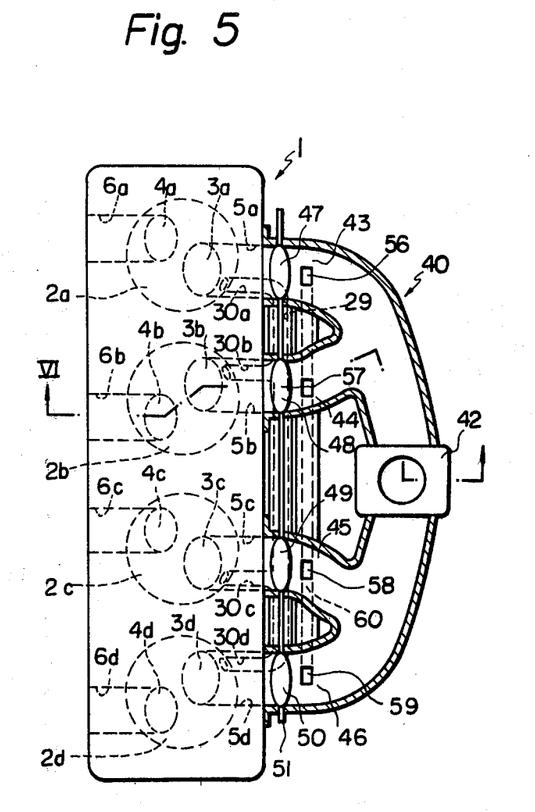
FIG. 5 is a plan view, partly in cross-section, of a still further embodiment according to the present invention.
Figure 6:
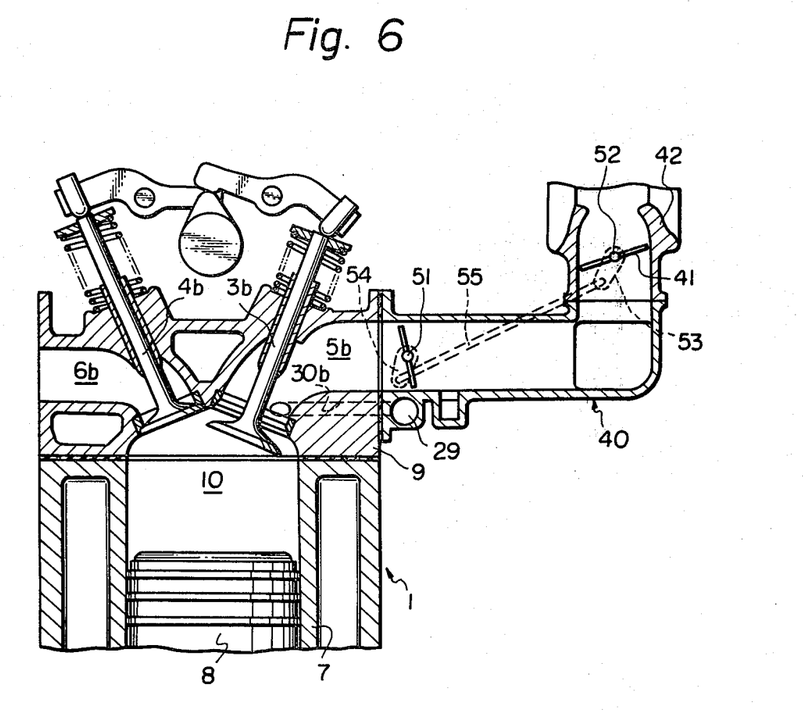
FIG. 6 is a cross-sectional side view taken along the line VI—VI in FIG. 5.

FIGS. 5 and 6 illustrate a still further embodiment according to the present invention. Referring to FIGS. 5 and 6, an intake manifold 40 is fixed onto the engine body 1, and a carburetor 42 having a throttle valve 41 is mounted on the intake manifold 40. The intake manifold 40 comprises manifold branches 43, 44, 45, 46 which are connected to the intake ports 5a, 5b, 5c, 5d, respectively. Secondary throttle valves 47, 48, 49, 50 are arranged in the outlets of the manifold branches 43, 44, 45, 46, respectively, and attached onto a common valve shaft 51. As is illustrated in FIG. 6, an arm 53 attached onto a valve shaft 52 of the throttle valve 41 is interconnected to an arm 54 attached onto the common valve shaft 51 by means of a link 55 so that the secondary throttle valves 47, 48, 49, 50 are gradually opened as the throttle valve 41 is gradually opened. In addition, the manifold branches 43, 44, 45, 46 are connected to a connecting conduit 60 via openings 56, 57, 58, 59 which are formed on the bottom walls of the manifold branches 43, 44, 45, 46, located upstream of the secondary throttle valves 47, 48, 49, 50, respectively. Thus, the manifold branches 43, 44, 45, 46 are interconnected to each other via the connecting conduit 60. In this embodiment, the changes in pressure produced in the intake port at a position near the rear face of the valve head of the intake valve are as shown in FIG. 7. Consequently, since the mixture is spouted from the channel branches 30a, 30b, 30c, 30d into the combustion chamber 10 at a high speed, a strong swirl motion is created in the combustion chamber 10. In addition, in either of the above-described embodiments, it is possible to recirculate the exhaust gas into the common connecting channel 29.

As is illustrated in FIGS. 1 through 6, by positioning the throttle valves 21, 22, 23, 24 at the outlets of the branch mixture passages 17, 18, 19, 20 and by positioning the secondary throttle valves 47, 48, 49, 50 at the outlets of the manifold branches 43, 44, 45, 46, the positive pressure which is caused by blowing the mixture back into the intake port is maintained without being attenuated. As a result of this, since the pressure difference between the positive pressure and the vacuum which act on the openings of the channel branches 30a, 30b, 30c, 30d is maintained at a large pressure difference for a long time, it is possible to produce an extremely strong swirl motion in the combustion chamber 10. In addition, as mentioned above, since the mixture flows within the common connecting channel 29 from a given cylinder towards the other cylinder, the mixing operation of the mixture is improved and, at the same time, the distribution of fuel to each cylinder becomes uniform.

According to the present invention, by the provision of the connecting conduit 31, 38, 60, the fuel can be uniformly distributed to each cylinder. In addition, by adopting simple construction wherein each of the intake ports located at a position near the rear face of the valve head of the corresponding intake valves is connected to the common connecting channel 29 via the respective channel branch, it is possible to produce a strong swirl motion in the combustion chamber. As a result, the burning velocity can be increased independently of the engine speed when the engine is operating under a light load while ensuring a high volumetric efficiency when the engine is operating at a high speed under a heavy load.

While the invention has been described with reference to specific embodiments chosen for purposes of illustration, it should be apparent that numerous modifications could be made thereto by those skilled in the art without departing from the spirit and scope of the invention.

What is claimed is:

1. A multi-cylinder internal combustion engine having a plurality of cylinders, each having a combustion chamber and an intake valve which has a valve head, said engine comprising:

at least two mixture passages, each mixture passage being common to at least two cylinders and comprising a collecting portion having an inlet, and at least two branch mixture passages branched off from said collecting portion of each mixture passage, each of said branch mixture passages being connected to a respective combustion chamber via a corresponding one of said intake valves;

fuel supply means arranged in an intake passage connected to the inlet of each of said collecting portions for delivering a metered flow of fuel from a fuel passage opening into the intake passage;

a common connecting channel;

at least four channel branches, each channel branch being connected to said common connecting channel and having an opening which opens into a corresponding one of said branch mixture passages, said common connecting channel opening only into said channel branches, and said channel branches opening only into said corresponding branch mixture passages, such that said branch mixture passages are continuously interconnected via said channel branches and common connecting channel;

throttle valve means arranged in said branch mixture passages at a position upstream of the openings of said channel branches and opened in accordance with an increase in the level of the load of said engine, there being no other valve means between the fuel passage openings and said throttle valve means, and;

a separate connecting conduit having at least two ports, each port opening into a corresponding mixture passage at a location between said valve means and said fuel supply means, said separate connecting conduit having no openings other than said ports, such that said separate connecting conduit is always open to said at least two mixture passages upstream of said valve means via said ports.

2. A multi-cylinder internal combustion engine as claimed in claim 1, wherein said ports of said separate connecting conduit being connected to said collecting portion each mixture passage.

3. A multi-cylinder internal combustion engine as claimed in claim 1, wherein said separate connecting conduit has a cross-sectional area which is smaller than that of said branch mixture passage.

4. A multi-cylinder internal combustion engine as claimed in claim 1, wherein said common connecting channel has a cross-sectional area which is smaller than that of said branch mixture passage.

5. A multi-cylinder internal combustion engine as claimed in claim 1, wherein each of said channel branches has a cross-sectional area which is smaller than that of said branch mixture passage.

6. A multi-cylinder internal combustion engine as claimed in claim 1, wherein the opening of each of said channel branches is arranged in the vicinity of said valve head of said corresponding intake valve.

7. A multi-cylinder internal combustion engine as claimed in claim 6, wherein the opening of each of said channel branches is directed to a valve gap formed between said corresponding intake valve and a valve seat thereof when said intake valve is opened.

8. A multi-cylinder internal combustion engine as claimed in claim 1, wherein said throttle valve means comprises at least four throttle valves, each being arranged in a respective one of said branch mixture passages.

9. A multi-cylinder internal combustion engine as claimed in claim 8, wherein said throttle valves are attached onto a common throttle shaft.

10. A multi-cylinder internal combustion engine as claimed in claim 8, wherein each of said throttle valves is arranged at a position near a respective one of said intake valves.

11. A multi-cylinder internal combustion engine as claimed in claim 10, wherein said at least two mixture passages comprise at least one carburetor housing forming therein said collecting portion and said at least four branch mixture passages each having an outlet which is connected to said respective combustion chamber via said corresponding intake valve, each of said throttle valves being arranged in the outlet of a respective one of said mixture passages.

* * * * *

UNITED STATES PATENT AND TRADEMARK OFFICE
CERTIFICATE OF CORRECTION

PATENT NO. : 4,441,464
DATED : April 10, 1984
INVENTOR(S) : Shuhei Toyoda and Toshio Tanahashi It is certified that error appears in the above-identified patent and that said Letters Patent is hereby corrected as shown below:

Col. 8, line 2, after "portion" insert --of--.

Signed and Sealed this

Fourth Day of September 1984

[SEAL]

Attest:

GERALD J. MOSSINGHOFF

Attesting Officer

Commissioner of Patents and Trademarks